United States Patent

[11] 3,613,033

[72] Inventor Peter A. Denes
 9101 Crestwood NE, Alburquerque, N. Mex. 87112
[21] Appl. No. 730,352
[22] Filed May 20, 1968
[45] Patented Oct. 12, 1971

[54] BROAD-BAND HIGH-FREQUENCY LOW-PASS FILTERS
 18 Claims, 33 Drawing Figs.

[52] U.S. Cl. .................................................. 333/79,
 29/25.42, 317/242
[51] Int. Cl. ....................................................... H03h 7/14
[50] Field of Search ............................................ 333/79, 70
 R; 317/242, 258

[56] References Cited
 UNITED STATES PATENTS

| | | | |
|---|---|---|---|
| 2,440,652 | 4/1948 | Beverly | 333/79 |
| 3,235,939 | 2/1966 | Rodriguez | 29/25.42 |
| 3,329,911 | 7/1967 | Schlicke et al. | 333/79 |
| 3,243,738 | 3/1966 | Schlicke | 333/79 |
| 3,289,118 | 11/1966 | Garstang | 333/79 |
| 3,320,557 | 5/1967 | Garstang | 333/79 |
| 3,436,693 | 4/1969 | Gray | 333/79 |
| 3,456,215 | 7/1969 | Denes | 333/79 |
| 2,721,311 | 10/1955 | Netherwood | 333/79 |

Primary Examiner—Herman Karl Saalbach
Assistant Examiner—C. Baraff
Attorney—A. Fred Starobin ABSTRACT: Broad-band high-frequency low-pass filters formed with capacitors which have structures including multilayer and ceramic types and monolayer capacitors. A passive element such as magnetic cores are contained wholly or partially within the capacitor structure. The filter units which may themselves form complete PI filters or L filters may also be combined as the inside portion of a tubular multilayer ceramic capacitor. Rolled capacitors may be used for distributed inductance and magnetic cores in combination with wound inductors or individually may be formed as portions of the filters.

PATENTED OCT 12 1971 3,613,033

INVENTOR
PETER A. DENES

BY  A. Fred Starobin
ATTORNEY

BROAD-BAND HIGH-FREQUENCY LOW-PASS FILTERS

The present invention relates to broad-band low-pass filters which have high attenuations both at lower frequencies, up to very high frequencies and which are capable of being made in subminiature form. These filters are of a type wherein at least one passive component of the filter is partially or completely located within a capacitor structure.

A passive component in connection with the present application refers to a capacitor, inductor, or resistor which will have an influence on the electrical behavior of the filter.

In many of the embodiments of the present invention a ceramic dielectric material of high dielectric constant, higher than 5, is used. Included in the expression "ceramic" is an inorganic solid state system composed of one or of a number of metal oxides or oxide compounds precipitated in a glass matrix or which latter ones may be even completely amorphous systems if they have dielectric constants higher than 5. Ceramic may also apply to composite systems of metal oxides and metals, if prepared by the usual methods of making ceramic bodies, such as sintering, hot pressing, etc. Such metal-metal oxide composites may be included as ceramic materials if their dielectric constant is greater than 5, and if their insulation resistance is greater than $10^6$ ohms per cm. allowing the preparation of useful ceramic capacitors. In this specification the word ceramic shall include all of the above-mentioned materials.

Tubular multilayer ceramic capacitors are an integral part of most of the filters of the present invention. There are at least four basic methods by which such tubular multilayer ceramic capacitors can be produced. It may be a rolled ceramic capacitor as described in my U.S. Pat. No. 2,693,629 issued Nov. 9, 1954. In one variation of the ceramic rolled capacitors the two electrode systems reach alternately to the one end and to the other end of the roll respectively where each is electrically, completely connected to eliminate as much as possible the self-inductance of the roll. This is the usual practice in the rolled paper or plastic capacitors also. Another method to produce such capacitors is to employ the dipping method described in my U.S. Pat. No. 3,016,597 issued Jan. 16, 1962, combined with the application of noble metal electrode layers between the dipping which are painted on, printed on, or sprayed on, etc. Again these electrode layers alternatively reach to the opposite ends of the capacitor in order to electrically connect the electrode layers of the same potential.

In a third version the tubular multilayer ceramic capacitors can be produced similarly to the second method except that the ceramic layers are not deposited by dipping but are formed by other known methods such as painting, printing, spraying, etc. Again the electrodes are deposited by dipping, painting, printing, and spraying, etc. between the ceramic layers following a suitable pattern to produce multilayer capacitors after firing. The material of the electrodes can be noble metals or any other conductor system which can be fired together with the ceramic material without unwanted chemical reaction between the electrodes and ceramic materials.

A fourth method of making tubular ceramic multilayer capacitors is discussed in connection with the present invention in the formation of the filters described herein.

In connection with the present invention, when the expression "tubular multilayer ceramic capacitor" is used, it should be understood that any of the above-described types and those described in more detail in the following text when used singly or in combination, are called by this collective name.

In addition, the use of the expression "magnetic core" does not limit the applicable magnetic material in any respect. It can be any ferromagnetic metal or alloy, any powder core structure, or any ferrimagnetic material. However, such magnetic systems are preferred which have high losses, to effectively dampen resonance effects in this way.

One of the advantages which will inure from the structures according to the present invention is the compact packaging of filters, resulting in miniaturization, as well as other advantages such as less parallel capacitance of the inductor to ground, and also, more effective deresonation.

Basically the present invention is a low-pass filter utilizing the capacitor, which in some instances may be a tubular multilayer ceramic capacitor, and a passive component of the filter located partially or completely inside of the capacitor, with said passive component being a separate form of inductor or a combination of inductors and even a form of filter in its own right.

Other objects and advantages will be apparent from a detailed description of the embodiments of the invention. In the description, reference is made to the accompanying drawings of which.

Figure 1:
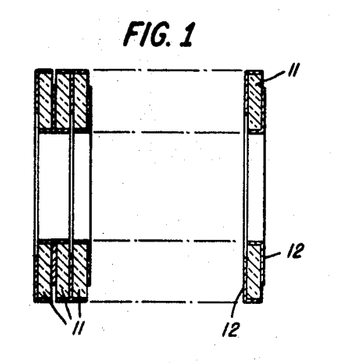
FIG. 1 shows the forming of a stacked multilayer ceramic capacitor formed from discs.

One of the methods of making tubular multilayer capacitors for the formation of filters, mainly the "fourth method" mentioned above, is disclosed in FIGS. 1 and 2. This involves the stacking of washer-shaped discs 11 which may be of ceramic material with electrode material 12 on the surface of each disc 11, as shown in FIG. 1. The discs are electroded with conductive layers forming electrodes 13 and 13' and stacked in a way so that the electrodes 14 or 15, which will be of the same potential, are connected to each other. These electrodes 14 and 15 can be applied while the discs 11 are green (unfired), then the discs 11 are united and the whole system is fired simultaneously. Alternatively, the discs 11 may be fired individually, then the electrodes 14 and 15 are applied and the discs 11 stacked together, uniting them by known means such as soldering or with conductive adhesives, etc. The interconnection of the systems of electrodes 14 and 15 are made on the outside and inside cylindrical surfaces respectively of the disc stack forming conductive layer electrodes 13 and 13'.

Figure 2:
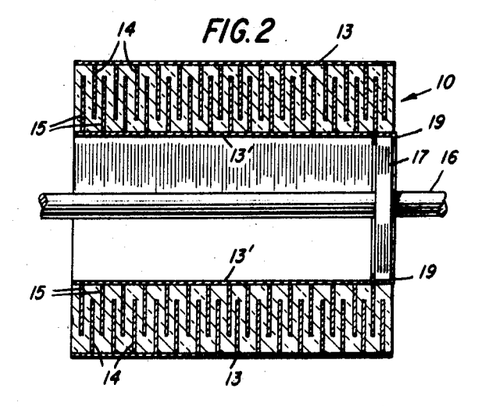
FIG. 2 shows a fully formed multilayer capacitor as formed in FIG. 1, but slightly enlarged.
Figure 3:
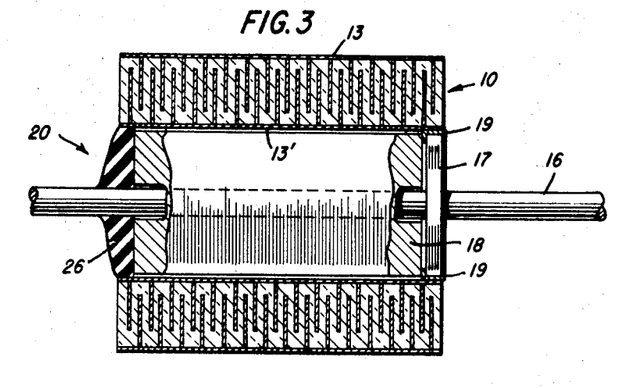
FIG. 3 shows a simple L filter formed by the steps illustrated in FIGS. 1 and 2.

FIG. 2 shows the finished multilayer disc capacitor 10 with a terminal 16 and a shoulder 17 supporting the terminal 16 in place. In order to complete a simple L filter as shown in FIG. 3, a magnetic core 18 is placed around the terminal 16 inside the tubular multilayer capacitor 10 with its embedded electrodes 14 and 15. The terminal 16 has the shoulder 17 which is solder-connected at solder points 19 to the inside electrode 13' of the capacitor 10. The filter 20 is potted with an insulating material 26 to insure ruggedness and environmental resistance.

By one of the other methods of construction, an electrically similar filter 21 shown in FIG. 4 is constructed again with the magnetic core 18 placed around the terminal 16 inside of the tubular multilayer capacitor 22, which may be ceramic, which on this figure has four embedded electrodes 23 and two outside electrodes 25 and 25' resulting in five parallel-connected capacitor sections. Again the terminal 16 has a shoulder 17 which is solder-connected at solder points 19 to the inside electrode 25' of the capacitor 22 with insulating material 26 used for purposes of potting.

Figure 4:
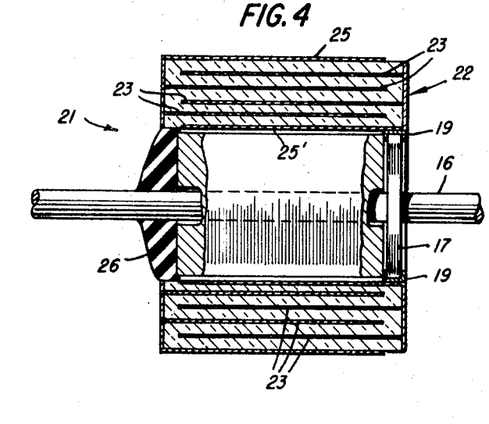
FIG. 4 discloses a simple L filter having a different form of embedded electrodes from FIG. 3.
Figure 5:
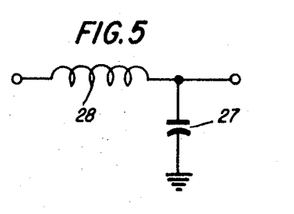
FIG. 5 discloses the circuit diagram of a simple L filter.

The capacitor and inductor elements 27 and 28 respectively of a simple L filter of the type illustrated in FIGS. 3 and 4 are shown on the schematic diagram of FIG. 5.

Figure 6:
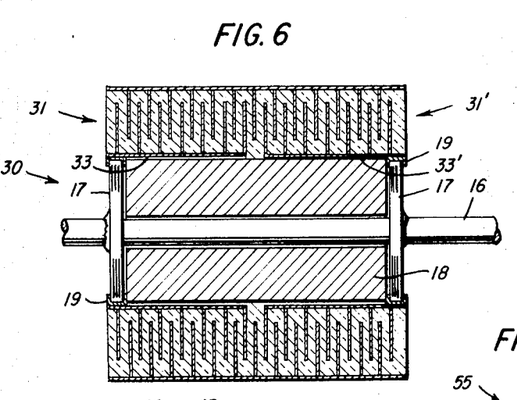
FIG. 6 is a pi-type filter utilizing the disc form of multilayer capacitor.

Still utilizing the simple magnetic core 18 as in FIG. 3, a variation of the multilayer disc capacitor is shown in FIG. 6. Therein is shown a laminated cofired discoidal filter 30 in which the layer capacitors are grouped in two sections 31 and 31'. Although only two sections 31 and 31' are illustrated, more than two may be used. These sections 31 and 31' are individually connected to the central terminal 16 through terminal shoulders 17. Between the sections, a ferromagnetic, or ferrite, or combined material magnetic core 18 is placed on the terminal 16. Since the capacitance of the individual sections 31 and 31' can be very high, such a filter 30 has a very good attenuation at less than 1 m.c.p.s. frequencies and has practically no dropouts even at very high frequencies. In FIG. 6, this form of filter is illustrated as a pi-type filter 30 in which the cofired disc capacitors are divided into two sections 31 and 31' and the internally leadout electrodes 33 and 33' of the two sections 31 and 31' respectively are electrically connected to the opposite ends respectively of the central terminal 16.

Figure 7:
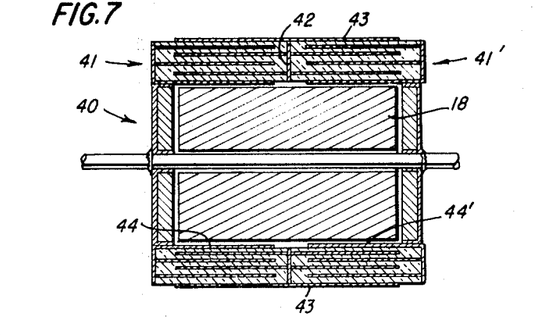
FIG. 7 is another embodiment of the pi-type filter using a multilayer capacitor.

Another type of filter having some similarities in construction to that shown in FIG. 4 is the double capacitor variation illustrated in FIG. 7. This is a multilayer pi-type filter 40, which is a combination of two multilayer capacitors 41 and 41', which again may be ceramic capacitors. To form such a filter, the silver layers are applied on one end of each of capacitors 41 and 41' and the two half capacitors are attached at the surface 42 either by using cofired silver solder or by any other suitable means. Next the external electrode 43 and the two half internal electrodes 44 and 44' are applied. The magnetic core 18 which is inserted therein may be made of any suitable magnetic material. Such a filter has a very high capacitance in both sections and therefore extremely high attenuation from very low frequencies on upwards.

Figure 8:
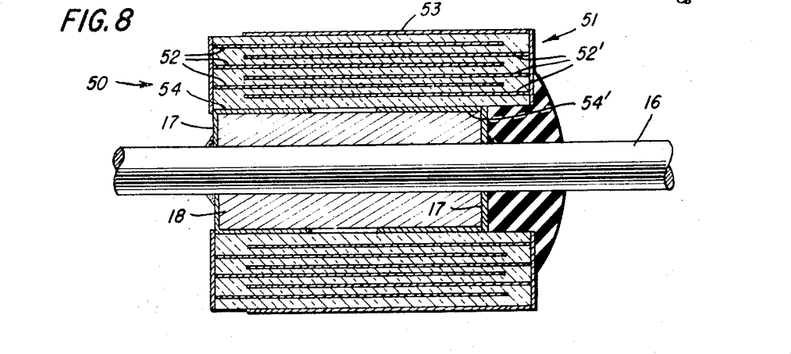
FIG. 8 is still another pi-type filter utilizing a still different capacitor combining a multilayer and single layer form.

A further variation of the double capacitor type of pi filter with a simple core is shown in FIG. 8. This may be a multidipped capacitor or capacitor formed in one of the ways previously discussed. In this case, the two capacitor sections are not uniform because one of them is of multilayer type and the other one consists of only one layer. The inductor 18 again can be made of any magnetic material. In the filter 50 of FIG. 8 there is shown a tubular multilayer capacitor 51, the parallel layers of electrodes 52 and 52' of which are picked up at the ends of the two sections forming the capacitor 51. The outside electrode 53 is united with all the ground electrodes 52'. The electrode 54—54' on the inside circumference of the cylinder is interrupted. The first part of it 54 is connected with all the nonground electrodes 52. The second part 54' does not reach to the end of the tube so as not to short out to the ground electrodes 52' collecting conducting surface. There is a core 18 on the terminal 16 of the filter 50 which can be made of ferromagnetic or ferrimagnetic material. All the nonground electrodes 52, including the first part 54 of the innermost electrode, are soldered with the help of washers 17 in the usual way to the terminal 16. The end of the second part 54' of the interrupted innermost electrode is also soldered to the terminal 16 with the help of a washer 17 in the usual way.

The filter shown in FIG. 8 is therefore the combination of a high-capacitance capacitor and a pi filter. At low frequencies, the high capacitance assures a good attenuation. At high frequencies the pi filter assures the absence of spurious resonances. The pickup conducting surfaces at the ends of the tube forming the capacitor 51, as well as the outside and inside electrodes 53 and 54—54' can be made of fired-on silver electrodes, electroless nickel plus electrolytic silver, etc. The electrodes 52 and 52' inside of the ceramic material should be made of a corresponding noble metal. A preferred embodiment of the means of electroding on the outside is to smear the end walls of the tube thickly with fired on silver to pick up all the noble metal electrodes all around the circumference. It is customary to add a powdered binding glass to the silver paste which is applied as fried-on electrodes, to increase the bond between the ceramic surface and the sintered silver layer electrode. Generally such glasses are employed which have a lower melting point than approximately 1,000° C. so that they sinter at about the same temperature as silver. Such glasses are e.g. bismuth borate, lead borate, lead metasilicate, etc. Their weight percentage may be between 2 to 10 percent of that of the silver. As the binding glass of the fired-on silver may increase the transition impedance between electrodes and grounds or electrodes and terminals, respectively, the tubes, after the end silvering has been fired on, are electrolytically silver plated so thickly that the outside should be a continuous silver layer and the glass should be covered up completely.

Figure 8A:
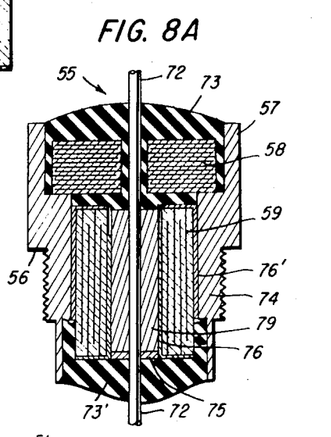
FIG. 8A is a compact form of a pi filter.

A form of filter 55 which utilizes both the multidisc construction and the tubular multilayer construction found in FIGS. 3 and 4, respectively, to form a very compact pi filter which can be mounted in a hexagonal bolt 56 is illustrated in FIG. 8A.

Inside the head 57 of hexagonal bolt 56 is multidisc capacitor 58 with through-going terminal 72 embedded in epoxy filling 73 at the head end 57 of the bolt 56. Adjacent thereto and at the opposite end 74 of bolt 56 is multilayer tubular capacitor 59 with washer 75 soldered to both terminal 72 and to an internal electrode 76 of capacitor 59. External electrode 76' is soldered to bolt 56. Epoxy filling 73' holds the terminal 72 in place at the end 74 of bolt 56. With this type of construction an extremely compact but effective filter may be built. With a multidisc capacitor 58 of capacitance of 0.6 mfd. and multilayer tubular capacitor 59 of capacitance of 0.18 mfd., and an iron dust core inductor 79, the attenuation may be independent of terminal currents up to 35 amps with greater than 100 db. attenuation from 20 mHz. to 30 gHz.

Figure 9:
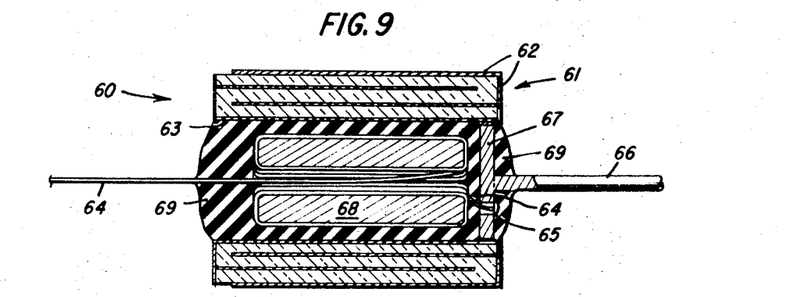
FIG. 9 illustrates an L filter with a multilayer capacitor and a wound magnetic core.

The filter shown in FIG. 4 is considered as having a one-turn magnetic core as an inductor. If additional turns are applied around the magnetic core as shown in FIG. 9, then the inductance is increased. In this magnetic core variation of an L-filter 60 of multilayer construction, the magnetic core 68 is wound with a wire 64. The right-hand end of wire 64 is soldered to terminal 66 at the point 65. The shoulder 67 of the terminal 66 is also soldered to the inside electrode 63 of the tubular multilayer ceramic capacitor 61. The filter 60 is then encapsulated both inside and at the ends with a suitable resin 69 and the filter has ground electrode 62.

Figure 10:
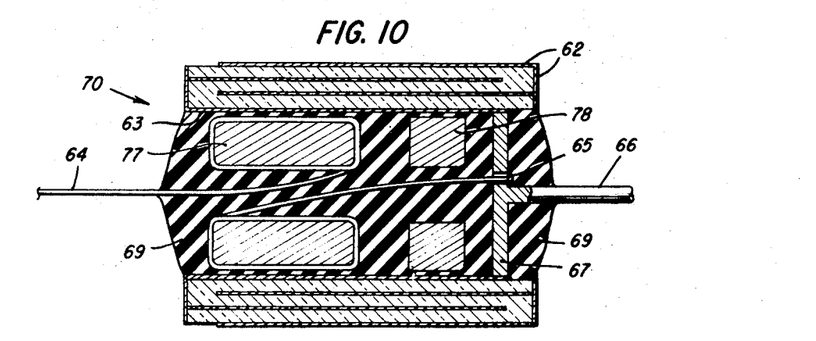
FIG. 10 illustrates another L filter utilizing a multilayer capacitor and a variation of wound inductors.

To insure that the filter should have no resonance drops up to 20 gHz. or higher, the inductor of a filter such as shown in FIG. 9 may have another variation of its magnetic core section. In FIG. 10 there is shown a filter 70 with an inductor consisting of two magnetic core parts 77 and 78, one of them 77 wound and the other 78 having just the one through-going wire 64. At very high frequencies at which both the main inductor and the wound inductor 77 of the second inside built L section may have coincidence resonances, the magnetic core 78 would be resonance free and secure a high minimum attenuation for the whole filter 70.

Figure 11:
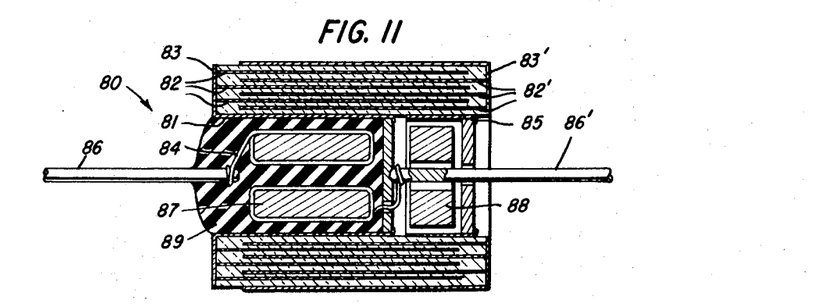
FIG. 11 discloses a double L-section filter again using a multilayer capacitor and a variation of wound inductors.
Figure 12:
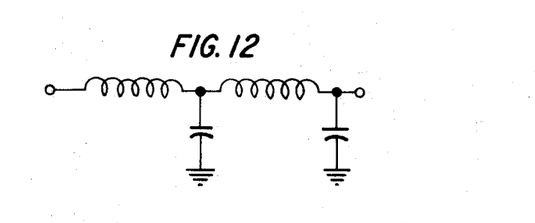
FIG. 12 is a schematic circuit diagram of a double L section filter of the type illustrated in FIG. 11.

FIG. 11 is a further use of the magnetic core variations with a multilayer capacitor but in this case a double L section filter 80 is illustrated showing a variation from the simple multilayer capacitor. A schematic circuit diagram of this double L-section filter is shown in FIG. 12. As with multilayer capacitor forms discussed, the ceramic tube has a number of embedded electrodes 82 and 82' connected alternatively at the opposite ends of the tube with the conductive surfaces 83 and 83' which latter conductor surface 83' also forms the ground electrode. The inductor of the first L-section has a magnetic core 87 wound with wire 84 which is soldered to the terminal 86. The inductor and part of terminal 86 are potted with a plastic material 89. The other end of wire 84 is soldered to the terminal 86', the shoulder of which terminal 86' is soldered to electrode 81. Electrode 85 is separated from electrodes 81 and 83' and forms with the embedded electrode 82' a second capacitor. The inductor of the second L-section consists of the core 88 which has only one turn, the through-going terminal 86', for the purpose of deresonating the filter 80. The electrode 85 is connected to terminal 86' with a washer which is soldered to both electrode 85 and to terminal 86'. Such filters 80 have very high attenuation. For example, such a filter 80 may have the following attenuation values: 14 kHz., 10 db.; 0.1 mHz., 60 db.; and 1 mHz. and up, 90 db. and up.

The whole unit 80 described in FIG. 11 can be built into a large multilayer ceramic tubular capacitor and it would then result in a triple L-section filter, with a large wound inductor in front of the large multilayer ceramic tubular capacitor (not shown).

Figure 13:
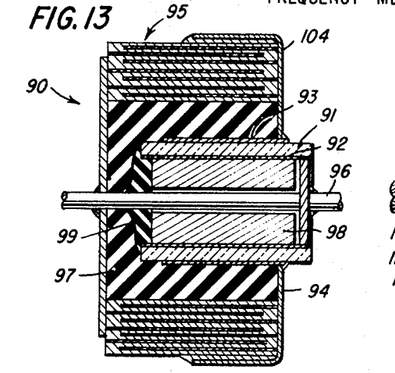
FIG. 13 illustrates a multilayer capacitor forming an L section with an additional L section located within the main L section.

Filters which must have reasonable attenuations at lower frequencies, such as in the kilohertz regions, need large inductances and capacitances. Consequently, wound inductors and layered capacitors must be used. Wound inductors have a sizeable self-capacitance which generates resonance effects at certain frequencies, and in some frequency spectra the input will be capacitive. These effects cause a great drop from the theoretical attenuation values. To improve the attenuation of such filters at higher frequencies in a way which would not increase the size to too great an extent, an L-section can be added to the main L-section which compensates for the resonant suckouts in the first L-section. Resulting filter 90 is a double L-type having high attenuation in the lower frequency ranges and very high attenuation at high frequencies. Such a filter 90 is shown in FIG. 13. A ceramic tube 91 having a continuous inside electrode 92 and an outside electrode 93 with side gaps is soldered on its outside electrode 93 to the grounding cap 94 of the multilayer capacitor 95. The terminal 96 of the capacitor formed with ceramic tube 91 and electrodes 92 and 93 is soldered at the right end to the inside electrode 92 of the tube 91. A magnetic core 98 is placed on terminal 96 and the left end of the tube 91 is potted with a suitable resin 99 to keep the terminal 96 and core 98 firmly in place. The left end of terminal 96 is connected to the main wound inductor of the filter 90, which is not shown, for purposes of clarity, but which would be also potted with the encapsulating material 97. The space between capacitors is potted with a suitable material, such as, for example, silicone rubber.

In a variation of FIG. 13, if deresonation is needed in the low megahertz regions, it is advisable to apply a few turns around core 98 instead of having just one turn, the through-going terminal 96. In that case, the spacing between the inside diameter of the ceramic tube 91 and the outside diameter of the magnetic core 98 must be large enough to accommodate the winding. The effectiveness of the second L-section can be augmented by employing a multilayer-type capacitor instead of the present ceramic tube 91 type of capacitor shown in FIG. 13. In an example of such a capacitor, if six turns are used around core 98, resulting in an inductance of 1 $\mu h$ and if the capacitance of the capacitor formed on ceramic tube 91 is 40,000 pF, the added attenuation of the second section would be 14 db. at 2 mHz. and 42 db. at 10 mHz.

In general in tubular multilayer ceramic capacitors the ratio between the inside and outside diameters can be quite substantial, without losing too much capacitance compared to the case when the inside diameter is zero. For instance, if this ratio is 1:2, there is a loss of only 25 percent in capacitance. On the other hand, the inside space in the capacitor thus gained can be utilized for placing other components therein. In the above-mentioned example, the decrease of the capacitance by 25 percent causes a decrease of the attenuation by only 2.2 db. as the following calculation shows:

$$20 \log(1/0.75) = 2.2$$

Figure 14:
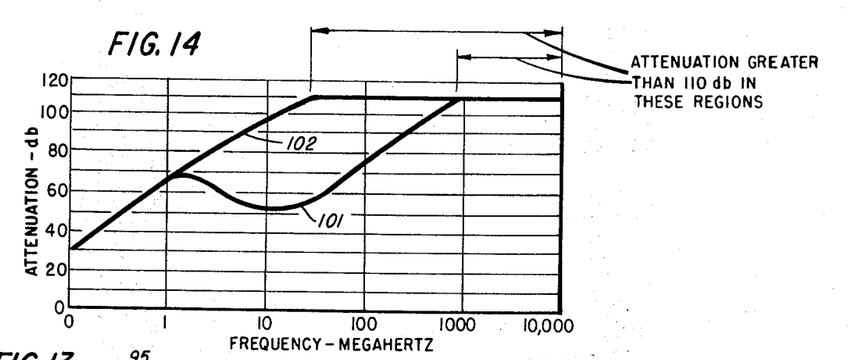
FIG. 14 is a graph showing attenuation improvement which is made by adding the internal L section as in FIG. 13.

Theoretically, this is the attenuation loss throughout the frequency range. Contrary to this, the filter shown in FIG. 13 has very good attenuation throughout a very broad frequency range, because the resonant effects of the first L-section are effectively counteracted by the practically resonance free second L-section. This second L-section does not have disturbing resonance effects because its inductor has only one turn, the through-going terminal. The curves on the graph in FIG. 14 show the attenuation curve 101 of the first L-section alone and the attenuation curve 102 of the full filter. If the filter has only one (the main) L-section, consisting of a large wound inductor with many turns before the multilayer ceramic capacitor (this wound inductor is not shown on FIG. 13), and of the multilayer ceramic capacitor, its attenuation curve 101 exhibits a suckout, due to the resonance effects in the large wound inductor (which is not shown on FIG. 13). The great number of turns create considerable parallel capacitance which at higher frequencies diminishes the impedance of the inductor. In the present example, a minimum in the attenuation curve 101 occurs around 10 Megahertz.

If the filter has also a second L-section as shown in FIG. 13, its unwound inductor does not have any appreciable resonances up to very high frequencies. As calculated above, the additional attenuation of the second L-section in this example is 42 db. at 10 Megahertz. Adding the additional attenuation of the second L-section at each point to line 101, line 102 is obtained which is the total attenuation of the double L-section filter.

If the filter as discussed in connection with FIGS. 13 and 14 must have a good attenuation in the low kilohertz region, it has to employ a large inductor with so many turns that resonance suckouts may show up below 1 mHz. Such filters can be effectively deresonated with an additive L-section built in the inside of the main tubular multilayer ceramic capacitor which would differ from the one shown in FIG. 13 in that its magnetic core may have several turns or its capacitor can have higher capacitance by being made in the form of a small multilayer ceramic capacitor itself, or both combined. For illustration of this, the filter 60 shown in FIG. 9 would be the form of filter which would be placed so as to be the internal filter in the configuration of FIG. 13. The complete L-section of FIG. 9 would therefore be wholly or partially placed inside of the main tubular multilayer ceramic capacitor 95 of the main L-section. Interconnection of the ground electrode 104 of the main tubular multilayer ceramic capacitor 95 with the ground electrode 62 of the multilayer ceramic capacitor 61 of the internal L-section is done in a similar way to that shown in FIG. 13 through the use of solder or a conductive adhesive system.

Figure 15:
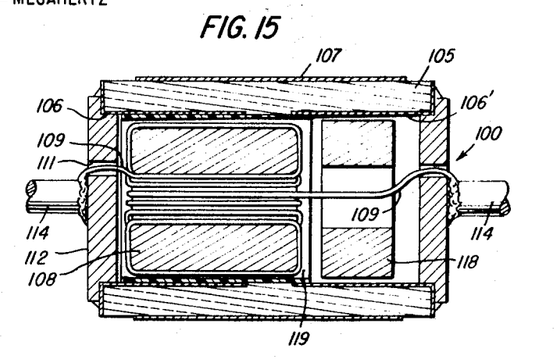
FIG. 15 illustrates a subassembly forming a pi filter which may be used within a multilayer capacitor in place of the internal L section shown in FIG. 13.
Figure 16:
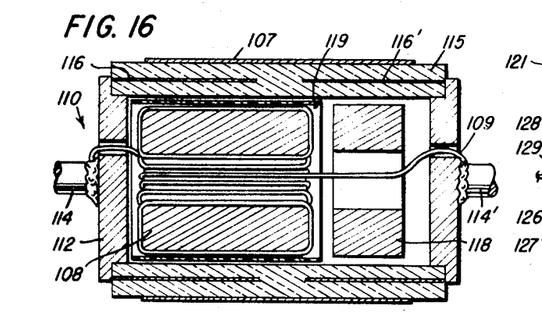
FIG. 16 is another form of pi filter which can be used as an internal subassembly with a multilayer capacitor.

Other subassemblies 100 and 110 which are filters within their own right, but which may also be used as the internal section within a main external filter of the multilayer capacitor type shown in FIG. 13 are shown in FIGS. 15 and 16.

A pi filter consisting of a ceramic tube carrying two capacitor sections and of a wound inductor inside of the ceramic tube becomes ineffective in the frequency ranges in which the wound inductor has a capacitive reactance. This drawback is eliminated and deresonating of the filter in the required frequency ranges takes place in the configurations of FIGS. 15 and 16.

The filter 100 in FIG. 15 consists of a ceramic tube 105 which has two inside electrodes 106 and 106' and one outside electrode 107. The magnetic core 108 has a winding, the wire 109 of which is conducted at the left-hand side through a fine hole 111 in the shoulder 112 of terminal 114 and is soldered to the washer-forming shoulder 112 and is wrapped around the central terminal 114 and also soldered to it. The right-hand end of wire 109 is passed through the center of a second magnetic core 118 and then is soldered to the terminal 114' in a similar way as on the left-hand side. The wound core 108 has a thin plastic wrapping 119 around it for protection. The wound inductor at its self-resonance frequency has a very high impedance but takes off rapidly when it becomes capacitive. In these frequency ranges the core 118 is still inductive. When the two cores 108 and 118 have a series resonance, the loss factor of the second core 118 is already so low that these resonances are ineffective. Hence, this filter 100 of FIG. 15 has a high minimum attenuation up to very high frequencies. A variation of the deresonated low-pass filter 100 of FIG. 15 is shown in FIG. 16 wherein filter 110 has inside electrodes 116 and 116' which are embedded in the ceramic tube 115.

The multilayer capacitor construction used in a filter may also be adapted to module construction. In fact, in addition to having the advantage of module construction, the multisection filter shown in FIG. 17 has the additional advantage of a better capacitance to ground relationship. This multisection modular construction places the inductor inside of the ceramic capacitor, solidly encapsulated and allows the modules to be assembled in contiguous relationship to each other, which two features secure the greatest possible packaging density. By placement of the wound magnetic core inside of the multilayer tubular ceramic capacitor, the capacitance to ground of the inductor is smaller than that which would be found if such inductors were merely placed within the casing itself.

Figure 17:
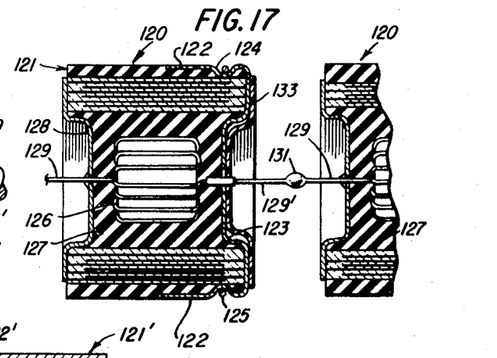
FIG. 17 illustrates a multisection filter of modular construction.

In FIG. 17 there is shown a filter formed of modules 120, each of which is formed of a capacitor 121 which is a multilayer ceramic capacitor, the first group of electrodes, the ground electrodes of which have been united after firing with silver cap 122, e.g. by means of fired-on silver. The cap 122 has an indentation 123 on its side holding a plastic washer 133 and also has an indentation 124 on its cylindrical surface to carry the solder ring 125. The next step in forming such a filter is the encapsulation of the inductor 126 inside of the capacitor 121 by any suitable means, for instance by the use of silastic material 127. Following that, a silver washer 128, having a similar cavity like the silver cap 122, is soldered to the side walls of the ceramic capacitor 121 to interconnect the second group of internal electrodes. The lead wire 129 of the inductor is also soldered to silver washer 128. Finally, the space between the case of the filter, which is not shown in this FIGURE, and the ceramic capacitor 121 is precast with a suitable potted material like silastic, using a removable plastic tube of material such as Teflon having the same inside diameter as the case of the filter.

An L-filter can be made of one such module 120 by shoving the module 120 into the cylindrical case of the filter and heating up the outside of the case at the place where the solder ring 125 is positioned inside of the filter. The central lead wires 129 of the inductor are soldered in the usual way to form a hermetic seal or by other means at the ends of the filter. As a multisection filter is made, the modules 120 are connected at the point 131 by soldering or using squashed-on metal tubes or by other known means in a position shown while the two modules 120 are at a sufficient distance to complete the joint. After that, the indentations on the silver caps 123 are filled with a suitable potting material, keeping it in an uncured state so that when the two modules 120 are pushed together so that they touch each other, the coiling-up lead wires 129' and 129 will penetrate into the soft potting material. After the modules 120 are connected in this way, the potting material is cured. In the final step, the chain of modules 120 is pushed into the filter case and all the solder rings 125 are firmly soldered to the inside of the case by applying heat at the right places on the outside of the case.

Figure 18:
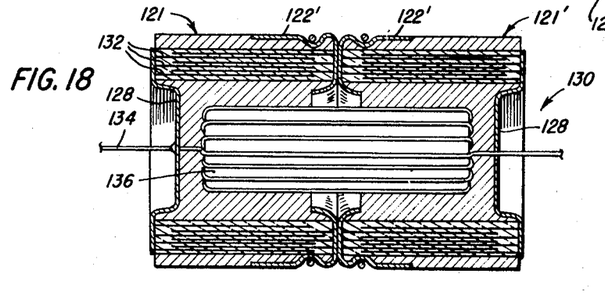
FIG. 18 illustrates another form of modular construction of a multisection filter.

Also using the modular construction, a pi filter 130 which has two multilayer capacitors 121 and one large inductor 136 may be formed as shown in FIG. 18. The two multilayer capacitors 121 are placed next to each other so that the silver washer 128 of each connecting the electrodes 132 to the central terminal are in the beginning of the first capacitor 121 and at the end of the second capacitor 121'. The silver caps 122' are next to each other and are electrically and mechanically connected without using the insulating washer 133. This connection can be made preferably with epoxy silver. The caps 122' have a complete opening for the inside of the capacitors 121 and 121' and consequently, a wound core 136 can be placed inside of the two capacitors 121 and 121', which core has the approximate length of the two capacitors. The wire 134 at the beginning and the end of the wound core 136 is soldered to the silver washers 128 in the usual way. An example of a filter produced in this manner would be a low-pass filter which has an outside diameter of 0.5 inch and a length of approximately 1.2 inches, which with a ferrite core would give 60 db. at 14 kHz. and 80 db. from 30 kHz. to 10 gHz. With an iron powder core it would give 80 db. from 0.15 mHz. to 10 gHz. The DC resistance of this filter would be approximately 2 ohms, current 1 amp and the voltage rating 100 or 200 vdc.

Figure 19A:
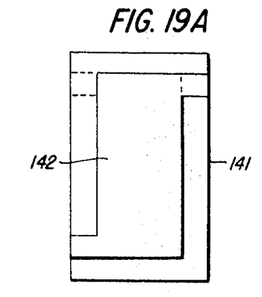
FIGS. 19a and 19b illustrate films which can be rolled to form a rolled capacitor.
Figure 19B:
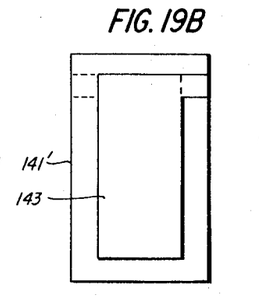
Figure 20:
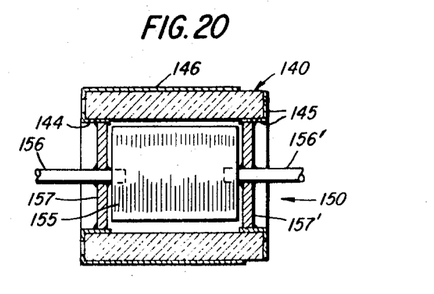
FIG. 20 illustrates the filter formed from a rolled capacitor, having distributed inductance.
Figure 21:
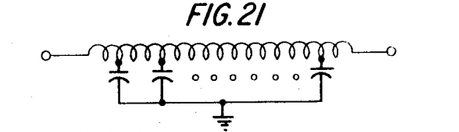
FIG. 21 is a circuit diagram of a filter formed by the rolled capacitor.

Another type of capacitor which can be made in the form of a multilayer capacitor is a rolled capacitor such as a rolled ceramic capacitor 140 shown in FIG. 20 which is prepared using two films 141 and 141' containing ceramic powder and which have specifically shaped electrodes 142 and 143 on their opposite sides. After the usual preparation of laying the two films 141 and 141' on top of each other facing identical electrode patterns, they are rolled and the roll is fired. The rolled ceramic capacitor 140 formed from the films 141 and 141' shown in fIGS. 19a and 19b is shown in completed form in FIG. 20. It will be provided on its outside surfaces with conductive layers 144, 145 and 146. Embedded layers are not shown in this drawing but are formed so as to produce a multilayer capacitor. Conductive layer 144 is in electrical connection with a beginning of electrode 142 and so is conductive layer 145 with the end of the electrode 142. Conductive layer 146 picks up the end of the electrode 143, which reaches to the side of the film strips. When the filter 150 is assembled, a magnetic core 155, which can be a tubular or rod-shape dust core pressed together, with the terminals 156 and 156', is placed inside of the roll. It should be noted that the core 155 naturally can be made of any other magnetic material. The magnetic washers 157 and 157' serve to solder the conductive surfaces and the terminals 156 and 156', respectively, electrically connecting conductive surface 144 to terminal 156 and conductive surface 145 to terminal 156'. Connecting the conductive layer 146 to ground, we have a filter 150 in accordance with the schematic drawing of FIG. 21. The capacitance and inductance in this filter is distributed.

Figure 22:
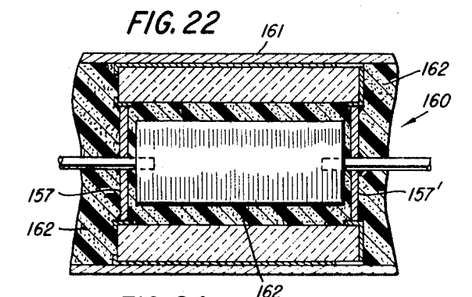
FIG. 22 is a filter formed with a rolled capacitor and encased in a cover.

The total inductance of the filter is mainly determined by the number of turns of the rolled capacitor because of the large air gap of core 155. FIG. 22 shows a method by which this air gap can be diminished. Washers 157 and 157' and case 161 are made of a magnetic material or alloy, and the inside and outside of the filter 160 is potted with a magnetic system, e.g. a resin filled with ferrite powders 162.

Figure 23:
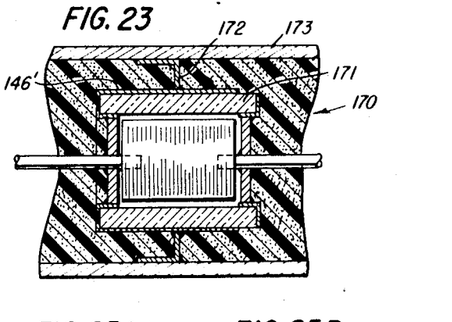
FIG. 23 is a filter of the type shown in FIG. 22 but encased so as to have a cushioning structure between filter and casing.

In another variation, FIG. 23 shows a means to elastically cushion the capacitor 171 of the filter 170 by applying a cap 172 which is made of a thin elastic metal or alloy. The cap 172 is soldered both to the case 173 and to the outside conductive layer 146' of the filter 170.

It should be noted that the rolled capacitor does not necessarily have to be a ceramic type, but any other dielectric material such as paper, and various plastics, can be used. This might be advantageous in cases in which a small capacitance is the goal, to prepare low-pass filters of very high cutoff frequencies. Furthermore, if a small inductance is needed, then the magnetic core 155 can be omitted and only the inductance of the electrode roll in air is utilized.

Figure 24:
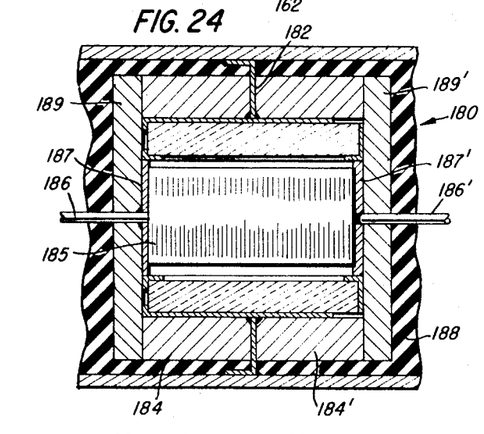
FIG. 24 is an encased filter of higher inductance value than that of FIG. 23.

FIG. 24 shows a variation of filters 160 and 170 mounted in a casing in which embodiment the filter 180 has a high inductance. In the construction in FIGS. 22 and 23, the magnetic flux lines of the core close through a relatively low permeability magnetic mixture, thus resulting in a lower average permeability of the complete inductor system. In FIG. 24, means are provided to be sure that the magnetic flux flows only through high-permeability magnetic parts. For that purpose, the washers 187 and 187', and the cap 182 are made of metals or alloys of high permeability, e.g. permalloy. The lead wires 186 and 186' may be made of magnetic materials, although their role in the magnetic circuit in this embodiment is not critical. The core 185, the discs 189 and 189' and the cylinders 184 and 184' are also prepared of magnetic materials, e.g. insulated powder iron compacts, ferrite, laminated metals or alloys. It is important that the materials of the components should have high permeability and high magnetic losses up to very high frequencies, to insure high inductance and high lossiness for the filter 180. For this purpose it is also important that the air gaps in the magnetic circuit should be minimum and the adjacent components of the magnetic circuit should lay against each other as tightly as possible. They can also be pasted together with magnetic particles containing adhesive which would greatly diminish air gap effects. The filter is potted with a resin 188 which does not have to be magnetic and which only contributes increased mechanical strength to the filter 180.

Figure 25A:
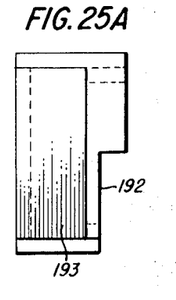
FIGS. 25a and 25b are film to be rolled for the formation of a different form of rolled capacitor.
Figure 25B:
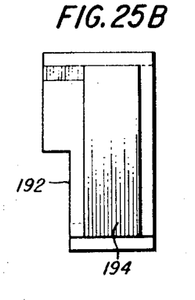

The filters 150, 160, 170 and 180 formed from the last-mentioned rolled capacitors have relatively high impedance of ground electrode to the ground since the strip 143 is long and wound. The attenuation can be increased if this impedance is decreased. FIGS. 25a and 25b show an electroded green ceramic strip 192 which allows the reduction of the impedance between ground electrode and ground because when the rolled capacitor is finished, electrode 193 reaches continuously to one edge of the capacitor where it can be coated with a conductive layer which diminishes the length between any point on the electrode and ground. This coating also shorts out the inductance to ground caused by the winding of the strip. Electrode 194 is on the opposite side of film 192 and has both its beginning and end on the same side of film 192. To avoid problems with shorting out electrode 194 with the two conductive layers which pickup the beginning and ending of the electrode 194 in the rolled-up capacitor, film 192 has a step which positions the beginning and end of the electrode 194 of the rolled capacitor on two different surfaces. This then forms the filter 190 shown in FIG. 26, again only showing the outside electrode without the embedded electrodes therein.

Figure 26:
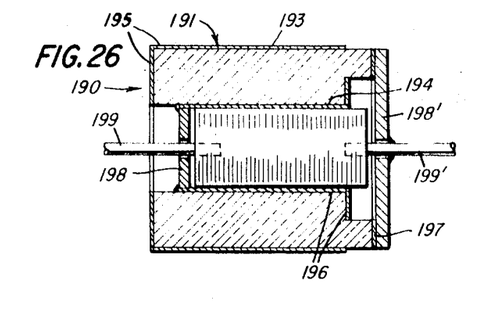
FIG. 26 is a rolled capacitor formed from the films of FIGS. 25a and 25b and having a reduced impedance measured between the ground electrodes of the capacitor and the ground over previously described rolled capacitors.

Any of the previous forms shown in FIGS. 22, 23 and 24 can be formed with the capacitor 191 which can be rolled using the two strips 192, and fired. As shown in FIG. 26, rolled capacitor 191 is supplied on its surface with three conductive layers: conductive layer 195 to pickup and shortout the windings of ground electrode 193; conductive layer 196 to pickup the beginning and conductive layer 197 to pickup the end of electrode 194. The washer 198 is soldered to conductive layer 196 and terminal 199. Washer 198' is soldered to conductive layer 197 and terminal 199', producing in this way the needed turns between terminals 199 and 199' around a magnetic core.

Figure 27:
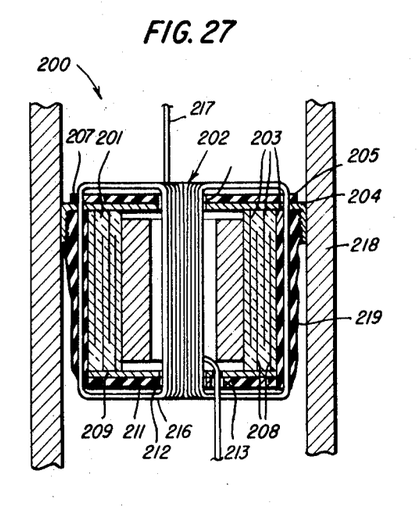
FIG. 27 illustrates encased L-section filter combining another form of multilayer capacitor and an inductor winding combination.
Figure 28:
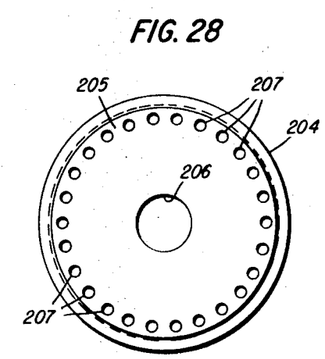
FIGS. 28 and 29 illustrate assemblies located at opposite ends of the multilayer capacitor in FIG. 27.
Figure 29:
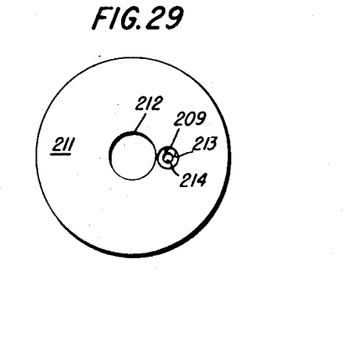

The multilayer capacitor 201 used with a wound inductor 202 to form an L-section filter 200 is further illustrated in FIG. 27 wherein is shown a variation in the structure of the winding. The inductor 202 is placed inside of the capacitor 201 and the outside diameter of the inductor 202 fits snugly in the inside diameter of the capacitor 201. The ground electrodes 203 are picked up by the cap 204, which is partially covered by a plastic washer 205. FIG. 28 shows the assembly of cap 204 and plastic washer 205 which have a large hole 206 in the middle and many small holes 207 close to the outer edge. The other electrodes 208 of the multilayer capacitor 201 are united and picked up by metal washer 209 which is covered by plastic washer 211. This assembly is shown in FIG. 29. Washer 209 and plastic washer 211 also have a large hole 212 in the middle and in addition each has one hole 213 and 214 at a position just outside of the circumference of the center large hole 212. The hole 213 in the plastic washer 211 is much larger than the hole 214 in the metal washer 209 to make possible the soldering discussed below.

The wire 216 of the inductor 202 is wound through the small holes 207 of the washer assembly shown in FIG. 28. The fact that each wire 216 goes through a predetermined hole 207 insures the correct number of windings, its uniform distribution and the minimum parallel capacitance of the winding. The plastic washers 205 and 211 protect the wire 216 from touching the metallic washers 204 and 209. One end of the wound wire 216 is soldered to washer 209 at hole 214. The other end is attached to the other terminal 217 of the filter. The cap 204 serves to connect the ground electrodes 203 to the casing 218 by soldering. The outside windings of inductor 202 are covered with plastic 219 for protection.

Figure 30:
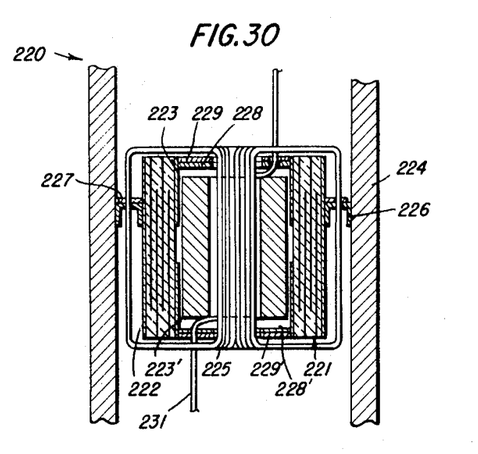
FIG. 30 illustrates a pi section filter utilizing a capacitor and winding combination similar to FIG. 27.

The same type of structure utilizing the inductor wound as described in FIG. 27 can be used to make pi filters such as that illustrated by the pi-section filter 220 of FIG. 30. In this figure, the tubular capacitor 221 has one outside electrode 222 and two inside electrodes 223 and 223'. The outside electrode 222 is soldered to the casing 224 with help of the metal cap 226. The cap 226 is covered with a plastic washer 227 and both cap 226 and plastic washer 227 have a similar arrangement of holes 207 as illustrated in FIG. 28. At the ends of the ceramic tube of capacitor 221 the metallic washers 228 and 228' are soldered to electrodes 223 and 223', respectively. They are also covered with the plastic washers 229 and 229'. The assembly of the washers 228, 229 and 228', 229' is the same as shown in FIG. 29, and both assemblies have one soldering hole similar to hole 214 to which the beginning and the end of the wire winding 225 are soldered, to complete the pi filter 220. After the soldering, the ends of wire 231 are continued to the terminals of the filter. The electrodes 223 and 223' may in the alternative be embedded in the ceramic tube of capacitor 221.

Various embodiments have been described regarding the structure of broad-band high-frequency low-pass filters in order to show some of the combinations possible in the present invention and arrangements that may be formed between the capacitance and inductance sections common to all the filters.

It will be obvious to those skilled in the art that various changes may be made and combinations may be used of the subassemblies which have been described herein without departing from the scope of the invention and the invention is not to be considered limited to what is shown in the drawings and described in the specification.

What is claimed is:

1. A broad-band high-frequency low-pass filter for blocking high-frequency interference from below 1 megahertz up to very high frequencies comprising
    at least one tubular multilayer ceramic capacitor,
    and at least one passive component having at least a portion of said component within said tubular multilayer capacitor including
    at least one inductor means wound about a magnetic core which has resonance effects within the frequency range from at least 1 to 100 megahertz,
    said multilayer capacitor having an inner diameter adapted to receive said portion of said passive component, the ratio between inside and outside diameters of said tubular multilayer capacitor being such that capacitance decrease is fractional whereby the corresponding decrease in attenuation of said filter is only a minimal number of decibels over said frequency range.

2. The filter of claim 1, further characterized by said multilayer capacitor being of large capacitance.

3. The filter of claim 1, further characterized by a conducting cap on one side of said tubular capacitor, a conducting washer on the opposite end of said tubular capacitor, a first insulating washer adjacent the outer surface of said conducting cap, and a second insulating washer adjacent the outer surface of said conducting washer, said inductor means being a wire conductor forming a winding enclosing said tubular capacitor and passing through said magnetic core.

4. The filter of claim 1, further characterized by said tubular multilayer capacitor being of dielectric material having a high dielectric constant exceeding 30.

5. The filter of claim 1, further characterized by said at least one tubular multilayer capacitor having a first set of electrodes and a second set of electrodes, said first set of electrodes including an outside electrode along the outer surface of said tubular capacitor and embedded electrodes within the material of said tubular capacitor, said second set of electrodes including at least to inside electrodes along the inner surface of said tubular capacitor and embedded electrodes within the material of said tubular capacitor in positions extending adjacent said embedded electrodes of said first set of electrodes.

6. The filter of claim 1, further characterized by said at least one passive component of the filter being a magnetic core having a plurality of windings formed by a wire conductor.

7. The filter of claim 6, further characterized by said at least one tubular multilayer capacitor having an electrode on its inner circumferential surface, a shoulder on a terminal of said filter connected to said electrode, and one end of said wire conductor connected to said shoulder.

8. The filter of claim 6, further characterized by an additional magnetic core being another passive component of the filter, said wire conductor passing through said additional magnetic core.

9. The filter of claim 6, further characterized by a terminal of the filter and one end of said wire conductor connected to said terminal, an additional magnetic core being another passive component of the filter with at least a portion within said tubular multilayer capacitor, said terminal passing through said magnetic core.

10. The filter of claim 9, further characterized by said tubular multilayer capacitor having at least two separate electrodes along its inner circumferential surface, only one of said electrodes connected electrically to said terminal of the filter.

11. The filter of claim 1, further characterized by a filter section having at least a portion within said tubular multilayer capacitor.

12. The filter of claim 11, further characterized by said filter section including a tubular capacitor, at least two magnetic cores within said tubular capacitor, a wire conductor forming a plurality of windings around at least one of said magnetic cores and passing through at least another of said magnetic cores, said wire conductor having its opposite ends connected to opposite terminals of said filter section.

13. The filter of claim 11, further characterized by a first conducting cap having an indentation in its side attached to said tubular multilayer capacitor, a solder ring carried in said indentation, a conducting washer attached to the opposite side of said tubular multilayer capacitor from said conducting cap, and wire ends extending from said wound inductor through said conducting cap and washer.

14. The filter of claim 13, further characterized by an insulating washer overlaying said first conducting cap whereby said conducting cap is insulated from an adjacent connected filter.

15. The filter of claim 13, further characterized by a second multilayer tubular capacitor in adjacent relationship to said first capacitor, a second conducting cap attached to said second capacitor in adjacent contacting relationship with said first conducting cap, a second conducting washer attached to the opposite end of said second capacitor from said second conducting capacitor, said wound inductor having at least a portion extending into each of said first and second capacitors.

16. The filter of claim 13, further characterized by a casing connected to said conducting cap.

17. The filter of claim 16, further characterized by a plastic covering between said wire conductor windings enclosing said capacitor and said casing.

18. The filter of claim 17, further characterized by said tubular capacitor having an electrode on its outer circumferential surface, and a pair of separate electrodes on its inner circumferential surface.

UNITED STATES PATENT OFFICE
CERTIFICATE OF CORRECTION

Patent No. 3,613,033         Dated October 12, 1971

Inventor(s) PETER A. DENES

It is certified that error appears in the above-identified patent and that said Letters Patent are hereby corrected as shown below:

IN THE ABSTRACT:

Line 6, change "Pl" to --Pi--

IN THE CLAIMS:

Claim 5, line 8, change "to" to --two--;

Claim 13, line 1, change "11" to --1--;

Claim 16, line 1, change "13" to --3--.

Signed and sealed this 14th day of March 1972.

(SEAL)
Attest:

EDWARD M. FLETCHER, JR.
Attesting Officer

ROBERT GOTTSCHALK
Commissioner of Patents